United States Patent [19]

Gerhold

[11] Patent Number: 4,599,160
[45] Date of Patent: Jul. 8, 1986

[54] SULFUR DISPOSAL

[75] Inventor: Bruce W. Gerhold, Bartlesville, Okla.

[73] Assignee: Phillips Petroleum Company, Bartlesville, Okla.

[21] Appl. No.: 702,096

[22] Filed: Feb. 14, 1985

[51] Int. Cl.[4] .................. C10G 1/00; C01B 17/16
[52] U.S. Cl. ...................... 48/210; 423/230; 423/244; 208/427
[58] Field of Search ............. 208/11 R, 8 R; 423/244 A, 244 R; 201/29, 34

[56] References Cited

U.S. PATENT DOCUMENTS

| | | | |
|---|---|---|---|
| 2,832,725 | 4/1958 | Scott, Jr. ........................ | 201/29 |
| 3,472,622 | 10/1969 | Ridley .......................... | 201/34 |
| 3,971,637 | 7/1976 | Matthews ..................... | 48/202 |
| 4,069,132 | 1/1978 | Deering ........................ | 208/11 R |
| 4,092,128 | 5/1978 | Harris et al. .................. | 48/197 R |
| 4,140,181 | 2/1979 | Ridley et al. ................. | 423/244 A |
| 4,164,544 | 8/1979 | Olsson et al. ................. | 423/230 |
| 4,404,086 | 9/1983 | Oltrogge ....................... | 208/8 R |

Primary Examiner—Andrew H. Metz
Assistant Examiner—Glenn Caldarola
Attorney, Agent, or Firm—R. C. Lutton

[57] ABSTRACT

Hydrogen sulfide recovered from pyrolysis zone effluent is separated and burned to produce sulfur oxides which are reacted with solid spent mineral byproduct.

8 Claims, 1 Drawing Figure

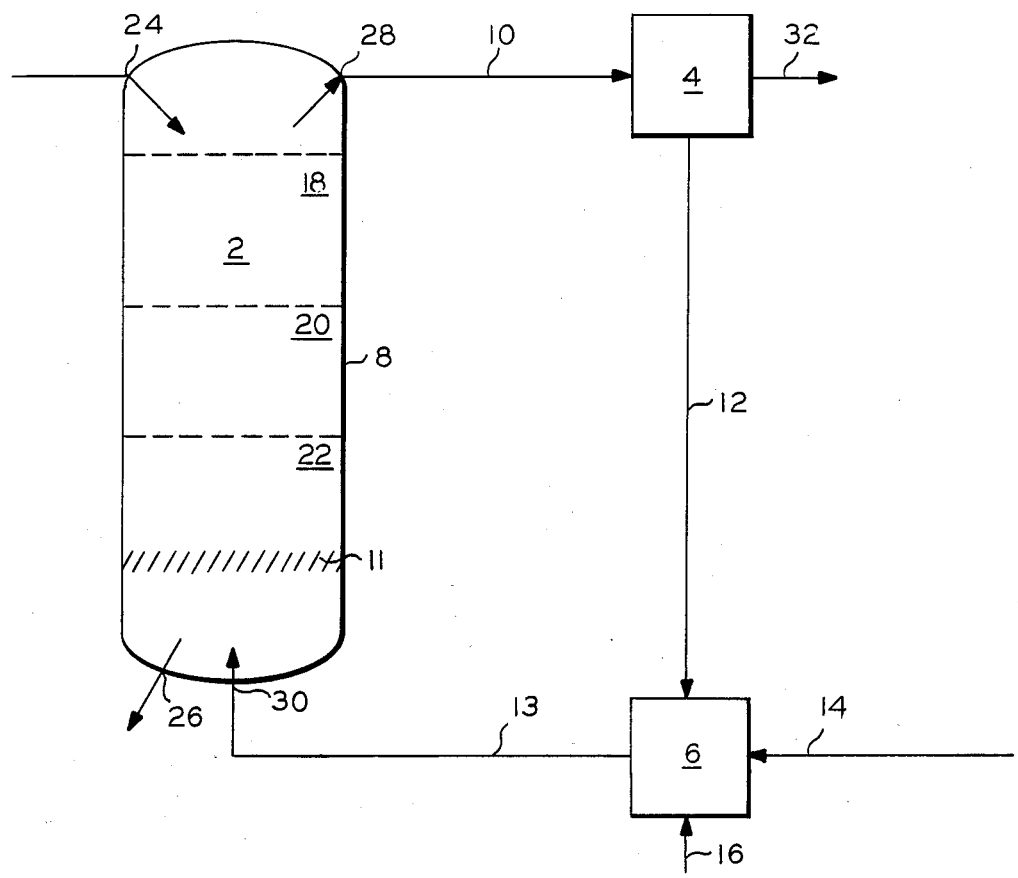

4,599,160

1

SULFUR DISPOSAL

BACKGROUND OF THE INVENTION

In one aspect, the invention relates to the processing of a hydrogen sulfide stream to facilitate its disposal. In another aspect the invention relates to controlling sulfur emissions from a synthetic fuels plant.

The liberation of hydrocarbon values from many sources also produces undesired gaseous sulfur compounds. Hydrogen sulfide, sulfur dioxide, and volatile sulfates are obnoxious materials and environmentally damaging. The environmentally acceptable disposal of sulfur-containing compounds is facilitated where they are in solid form. Thus, it is in many instances advantageous to convert gaseous sulfur compounds to solid ones where their disposal is desired. New techniques for accomplishing conversion of gaseous sulfur compounds would clearly be very desirable.

OBJECTS OF THE INVENTION

It is an object of this invention to convert hydrogen sulfide to a solid substance via a simple, two-step process.

It is another object of this invention to provide a mineral upgrading process in which gaseous sulfur emissions are controlled.

It is a further object of this invention to provide a solid mineral upgrading process for producing fuel values in gaseous and liquid form and sulfur byproduct in solid form.

STATEMENT OF THE INVENTION

In one aspect of the invention a normally solid mineral material is pyrolyzed to produce gaseous and/or liquid fuel values. Hydrogen sulfide byproduct is produced along with the fuel values. A solid, spent mineral product is also produced which is reactable with gaseous oxides of sulfur to form sulfur-containing solids. In accordance with the invention, the hydrogen sulfide is separated from the liquid and/or gaseous fuel values and combusted with an oxygen-containing gas to form gaseous oxides of sulfur. The thus produced gaseous oxides of sulfur are then reacted with the solid, spent mineral product to form sulfur-containing solids which are relatively easy to dispose of in an environmentally sound manner.

BRIEF DESCRIPTION OF THE DRAWING

The FIGURE illustrates schematically certain features of one embodiment of the invention.

DETAILED DESCRIPTION OF THE INVENTION

In accordance with the one embodiment of the invention, an apparatus comprises a means 2 for providing liquid and/or gaseous fuel values from a normally solid mineral such as lignite, coal or oil shale. For lignite gasification, the fuel value stream is predominantly CO and $H_2$. For other pyrolysis processes, the fuel values may be predominantly hydrocarbon, depending on the process. A separation zone 4 is provided for separating an undesired hydrogen sulfide stream from the fuel value stream. A zone 6 is provided for combusting the hydrogen sulfide stream with an oxygen-containing gas. A conduit means 10 connects the pyrolysis means 2 with the separation zone 4. A conduit means 12 connects the separation zone 4 with the combustion zone 6.

2

A line 14 carrying an oxygen-containing gas empties into zone 6. An optional steam line 16 is shown to empty into zone 6 in the illustrated embodiment. It should be appreciated that the combustor 6 could be positioned in the pyrolyzer 2 if desired, such as below a grate 11 in a lower portion thereof.

The means 2 will usually be determined by a vessel 8 which preferably contains a moving bed of the solid mineral particles. Preferably, the unit is of the vertical downflow type and uses countercurrent upward flow of gas, although the invention could be applied to a bed traveling on a circular grate through the treating zones as well, or to batch operations in which a plurality of vessels are operated under sequenced processing with cross-flow of gases between the vessels. For lignite liquefaction or gasification, the unit 8 can suitably be of the Lurgi type. For oil shale liquefaction or gasification, the unit 8 can be of the Hytort or Paraho type. Preferably, the particulate moves first through a preheat/pyrolysis zone 18 in which it is heated to a pyrolysis temperature in the range of from about 800° to about 1200° F.; then into a combustion zone 20, where combustion of residual carbonaceous material with oxygen containing gas occurs and then into a cooling zone 22 where the particulate is cooled by flow of relatively cool gas. The combustion zone 20 may achieve a temperature of up to 2000° F. The particulate in the cooling zone 22 is preferably cooled to a temperature of between 100° and 300° F. prior to discharge.

The stream 13 containing the gaseous oxides of sulfur formed in the combustor 6 is perferably diluted with sufficient oxygen-containing gas so as to be at a temperature of only in the range of from about 100° to about 300° F. to adequately cool the particulate to be discharged. As these gases flow upwardly in the illustrated embodiment through the cooling section 22 they encounter increasingly hot descending particulate from the combustion zone 20 until a capture of the sulfur oxide species by alkaline or alkaline earth ash components from the zone 20 occurs.

The vessel 8 preferably has an inlet 24 adjacent to its upper end for introducing the normally solid mineral to be pyrolyzed and an outlet 26 ajacent to its lower end for withdrawing spent mineral product and sulfur-containing solid. An outlet 28 near the upper end of the vessel 8 provides for the withdrawal of the liquid and/or gaseous fuel values containing hydrogen sulfide byproduct. At least one inlet 30 near the lower end of the vessel 8 provides for the introduction of the gaseous oxides of sulfur from the combustor 6 as well as the oxygen containing gas supply for the zone 20.

The separation zone 4 will normally contain one or more fractionators, with a normally gaseous fractionator product containing acid gases being passed to an acid gas treater such as an alkanolamine absorber. The stream 12 will usually be withdrawn from the acid gas stripper following the amine absorber. The stream 12 thus may also contain substantial quantities of $CO_2$ and $H_2O$ as well as $H_2S$. The product stream containing the desirable fuel values in gaseous and/or liquid form may be withdrawn from the zone 4 via the line 32.

The combustion process occurring in the zone 6 will be facilitated where the combustion of the hydrogen sulfide occurs under near stoichiometric conditions. The additional oxygen requirements for the combustion zone 20 can be metered in downstream of the $H_2S$ combustion so that a high enough temperature can be maintained to support the combustion process occurring in the zone 6. If desired, oxygen-containing gas can be introduced into the vessel 8 separately from the line 13.

The sulfur oxides produced in the zone 6 are reactive with oxides of alkaline and/or alkaline earth metals. Because the reaction product between sulfur oxides and oxides of alkaline earth metals are highly insoluble it is preferred that alkaline earth metal oxides be present in the cooling zone 22. Good results are expected where in the range of from about 0.5 up to about 5 percent by weight of alkaline earth metal oxides, calculated as the metal, are present in zone 22, preferably in a finely dispersed form. Where alkaline earth metal oxides, or precursors of alkaline earth metal oxides, such as dolomite, limestone, calcium hydride, etc., which are convertible to alkaline earth metal oxides in the combustion zone 20 are present in the feed to the pyrolyzer 2, the sulfur oxides from the combustor 6 will react in the pyrolyzer 8 in a satisfactory manner. Where alkaline earth metal oxides or their precursors are not a natural component of the solid mineral to be pyrolyzed, or are not present in sufficient amounts, as may be the case with low-ash coals, they can be incorporated into the mineral feed as an additive to promote reaction between solid spent mineral product and the gaseous oxides of sulfur. For example, lime (CaO) or limestone can be added to the feed to the pyrolyzer 2 to promote the formation of sulfur-containing solids in the cooling zone 22 with spent residual from lignite pyrolysis.

Any gaseous oxides of sulfur which may be emitted from the pyrolyzer 2 can of course also be recycled to near the particulate discharge end of the pyrolyzer after having first been separated from the fuel values. Preferably, the recycled $SO_x$ emissions from the unit are cooled to within the range of 100°–300° F. such as by dilution with cool oxygen-containing gas prior to introduction into the cooling zone 22.

What is claimed is:

1. In a process for recovering fuel values containing hydrogen sulfide by-product from the pyrolysis of a normally solid mineral with the production of solid, spent mineral product, which is reactable with gaseous oxides of sulfur to form sulfur-containing solids, the improvement comprising:
    separating a hydrogen sulfide gas stream from the fuel values;
    combusting the hydrogen sulfide gas stream with an oxygen-containing gas stream to form an off-gas stream containing oxides of sulfur; and
    reacting the thus produced off-gas stream containing oxides of sulfur with the solid, spent mineral product from pyrolysis to form a sulfur-containing solid by-product stream.
2. A process as in claim 1 wherein the pyrolysis is conducted in a moving bed of normally solid mineral particles.
3. A process as in claim 2 wherein the mineral particles are selected from the group consisting of lignite and oil shale.
4. A process as in claim 3 wherein the normally solid mineral comprises lignite and the fuel value is predominantly in the form of CO and $H_2$.
5. A process as in claim 4 wherein the moving bed of particles is of the vertical downflow type, having an upper end and a lower end.
6. A process as in claim 5 wherein the gaseous oxides of sulfur are introduced near the lower end of the vertically downflowing moving bed of particles.
7. A process as in claim 6 wherein the solid spent mineral product contains oxides of alkaline and/or alkaline earth metals.
8. A process as in claim 7 further comprising incorporating an additive into the solid mineral to be pyrolyzed to provide oxides of alkaline and/or alkaline earth metals in the solid spent mineral product and promote the activity of the solid spent mineral product for reaction with gaseous oxides of sulfur.

* * * * *